United States Patent [19]

Avery

[11] Patent Number: 4,767,132
[45] Date of Patent: Aug. 30, 1988

[54] ENCLOSED TRAILER FOR BOATS

[76] Inventor: W. Burl Avery, P.O. Box 256, Onalaska, Tex. 77360

[21] Appl. No.: 91,117

[22] Filed: Aug. 31, 1987

[51] Int. Cl.⁴ .............................................. B60P 3/10
[52] U.S. Cl. .............................. 280/414.1; 280/423 R; 280/789; 296/100; 296/181
[58] Field of Search ............... 280/414.1, 414.2, 414.3, 280/401, 403, 423 R, 785, 789, 47.13 B; 296/100, 181; 414/529, 542

[56] References Cited

U.S. PATENT DOCUMENTS

| 2,992,040 | 7/1961 | Groth et al. | 296/100 |
| 3,116,949 | 1/1964 | Muse | 280/414.1 X |
| 3,193,321 | 7/1965 | Rose | 280/414.1 X |
| 3,287,058 | 11/1966 | Wells | 280/789 X |
| 3,448,875 | 6/1969 | Robinson, Jr. | 414/542 |
| 3,604,580 | 9/1971 | Geister | 280/414.1 X |

FOREIGN PATENT DOCUMENTS 3345962  6/1985  Fed. Rep. of Germany ...... 296/100

Primary Examiner—John J. Love
Assistant Examiner—Charles R. Watts
Attorney, Agent, or Firm—Peter L. Klempay

[57] ABSTRACT

A trailer which provides full enclosure for a boat during transport while permitting direct launch of the boat therefrom includes a floor with a sliding panel at the rear thereof, side walls, a top wall the forward portion of which is fixed and the rear portion thereof slidable between a forward, open position and a rear, closed position, and a rear door.

8 Claims, 4 Drawing Sheets

ENCLOSED TRAILER FOR BOATS

The present invention pertains to trailers for transporting boats and, more particularly, to such trailers which fully enclose the boat during transportation and from which the boat may be directly launched.

BACKGROUND OF THE INVENTION

The most commonly used boat trailer consists of a chassis with road wheels, a hitch at the forward end thereof for connection to the towing vehicle, and means, such as rollers and/or skids, on the upper side of the chassis for cradling the hull of the boat. With a trailer of this type, the boat is exposed during transport and storage and, accordingly, subject to damage, as from traffic thrown stones, for example, and from vandalism.

While enclosed boat trailers offer protection against such damage, existing enclosed trailers have found only limited acceptance, due, at least in part, to the additional labor required in loading and unloading the boat. U.S. Pat. No. 3,448,875, Robinson, Jr., discloses an enclosed trailer for carrying a boat, the trailer being provided with a rearwardly telescoping overhead support mechanism and hoist for moving the boat between the housed position within the trailer and a body of water in which the boat is launched. This arrangement, while providing for the handling of the boat, involves an expensive trailer construction.

It is the primary object of the present invention to provide an enclosed trailer for a boat which trailer facilitates the maneuverring of the boat between the housed and launched positions.

It is also an object of the present invention to provide such an enclosed trailer for a boat which, in addition to providing full protection for the boat, provides readily accessable auxiliary storage.

A further object of the present invention is the provision of such an enclosed trailer for a boat which has a compact and aerodynamic external configuration.

SUMMARY OF THE INVENTION

The above and other objects of the invention which will become apparent hereinafter are achieved by the provision of an enclosed trailer for a boat which includes a chassis mounting an axle with road-engaging wheels and, at the forward end thereof, a hitch for connection to a towing vehicle; a body supported on the chassis and including a floor, opposed side walls, a front wall, and a top wall; boat hull engaging rollers and/or skids mounted on the floor to define a boat receiving cradle; and a tail gate assembly for closing the rear of the body; the rearmost portion of the top wall being movable between a closed position and a forward position to furnish access and the floor including, in the rear central portion thereof, a movable panel to provide clearance for an outboard motor during launching. Preferably, the front wall of the body is of angled configuration for improved aerodynamics and includes a door providing access to the forward portion of the trailer.

For a more complete understanding of the invention and the objects and advantages thereof, reference should be had to the accompanying drawings and the following detailed description wherein a preferred embodiment of the invention is illustrated and described.

DESCRIPTION OF THE PREFERRED EMBODIMENT

Figure 1:
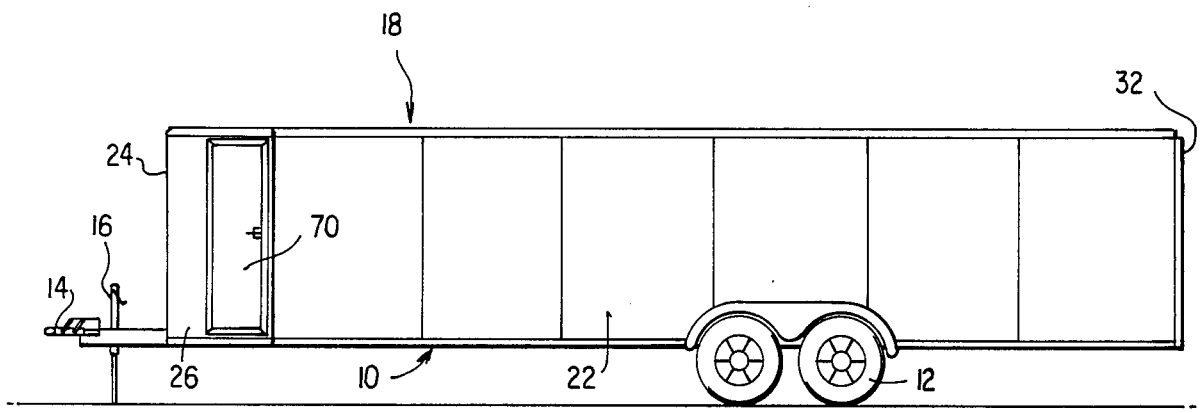
FIG. 1 is a side elevational view of the boat trailer of the present invention.
Figure 2:
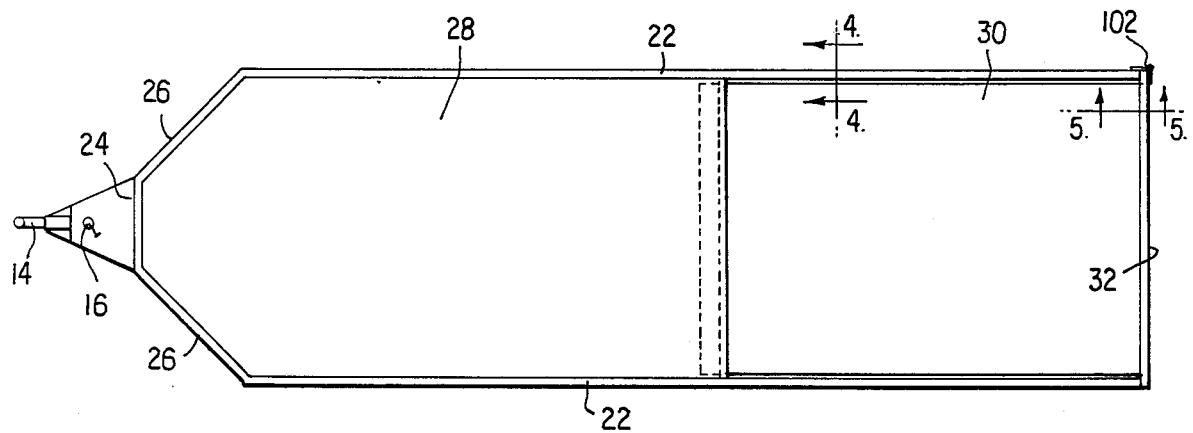
FIG. 2 is a top plan view thereof with the access doors and roof panel in the closed positions.
Figure 3:
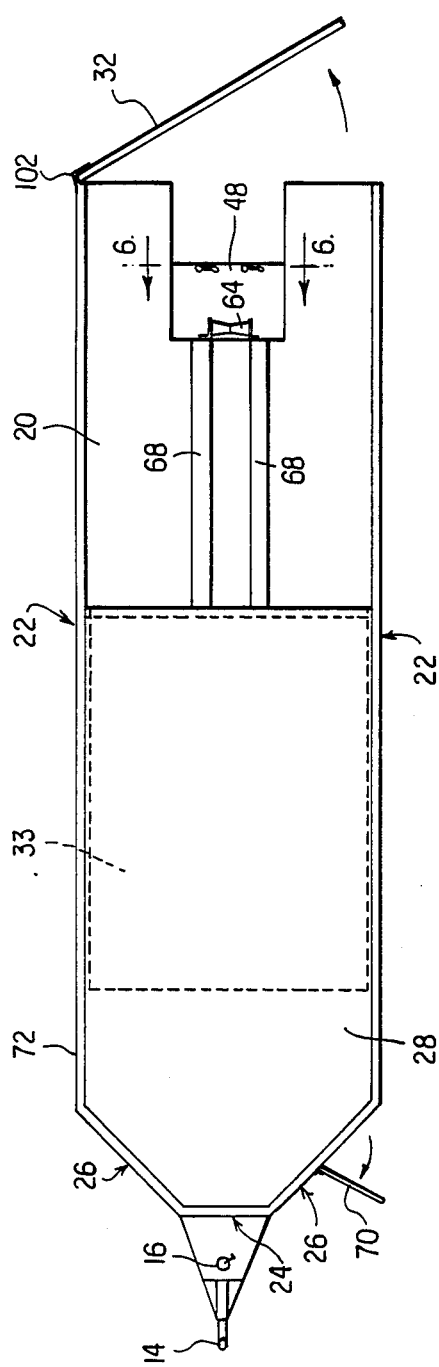
FIG. 3 is a top plan view with the doors and roof panel moved to the open positions.

The enclosed boat trailer of the present invention includes a frame, designated generally by the reference numeral 10, supported by a wheel assembly 12 and, at the forward end of the frame, by a conventional trailer hitch 14 and tongue jack 16. As can be seen from the plan views, the frame is of rectangular configuration with a forwardly tapering front end. Mounted on the frame is the trailer body 18 consisting of a floor 20, vertical side walls 22, front wall assembly including a transverse central section 24 and angled side sections 26 joining the forward ends of the side walls, and a roof or top wall including a forward, fixed section 28 and a rear, movable section 30. The rear of the trailer body is closed by a door 32.

Figure 7:
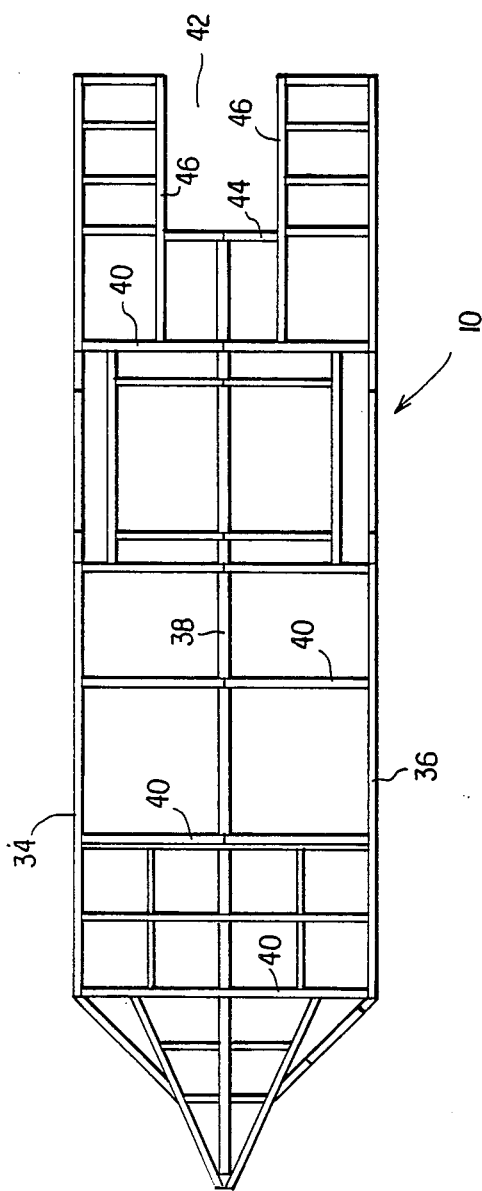
FIG. 7 is a plan view of the trailer frame.
Figure 8:
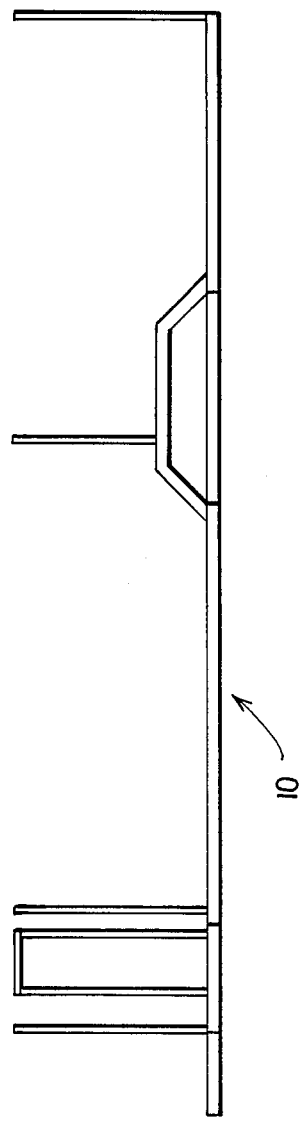
FIG. 8 is a side elevational view of the frame.

The frame 10 may be of any conventional construction, for example, being fabricated of steel tubing, channel and/or angle members. As is shown in FIGS. 7 and 8, the frame may include side rails 34 and 36, a center rail 38 and transverse framing members 40. In the forward or auxiliary storage section of the trailer, the upper surfaces of the side and center rails are level while, in the boat carrying section, the center rail is lowered thus providing an inwardly sloping floor for drainage of water carried into the trailer when loading a boat therein. At the rear of the frame, an unobstructed rearwardly open area 42 is provided, the center rail terminating at a transverse framing member 44 with longitudinal framing members 46 defining the sides of the open area and extending forwardly therefrom. With the exception of the open area 42, the frame is covered with a floor 20 such as aluminum treadplate.

Figure 6:
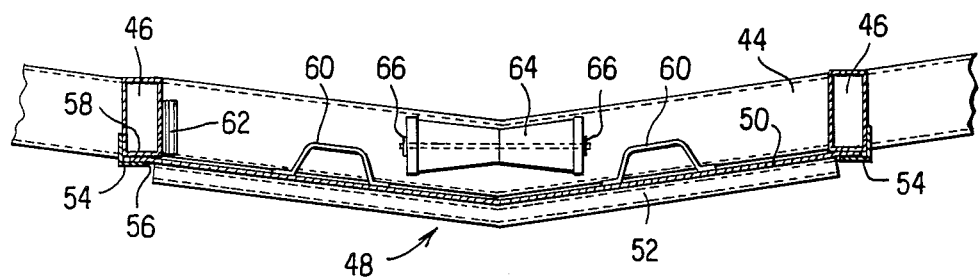
FIG. 6 is a fragmentary transverse cross sectional view taken on the line 6—6 of FIG. 3.

A closure panel 48 is provided for the open area 42, the panel being formed, for example, of a rectangular aluminum treadplate piece 50 strengthened with steel tubing 52 secured to the underside thereof. Angle members 54 attached to the lower outer faces of the longitudinal frame members 46 define, with the framing members, inwardly opening channels 56 extending the length of the frame members 46 (see FIG. 6). The opposed lateral edges 58 of the closure panel 48 are slidably received in these channels 56 whereby the panel may be moved between a forward, open position and a rear position closing the floor of the trailer. Handles 60 are provided on the panel and a latch mechanism 62, which may be a conventional sliding door latch, is provided to secure the panel in either of the open and closed positions.

Completing the description of the trailer frame and floor configuration, a boat guide roller 64 is provided at the forward end of the open area 42, the roller being journalled in brackets 66 affixed to the rear face of the transverse framing member 44 with the roller being located above the closure panel 48. A pair of boat cradling bunks 68 extend forwardly of the open area, equally spaced on opposite sides of the longitudinal centerline of the trailer.

Figure 4:
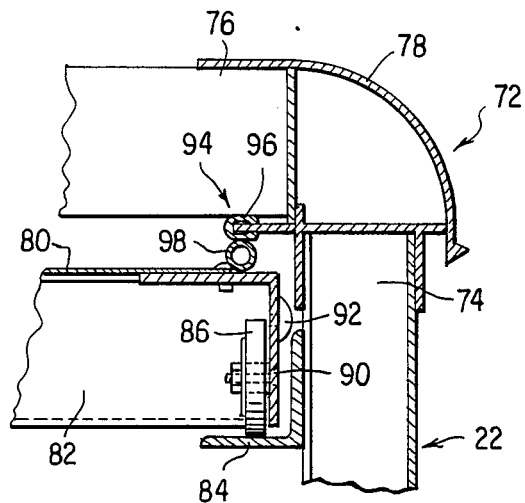
FIG. 4 is a fragmentary transverse cross sectional view taken on the line 4—4 of FIG. 2.
Figure 5:
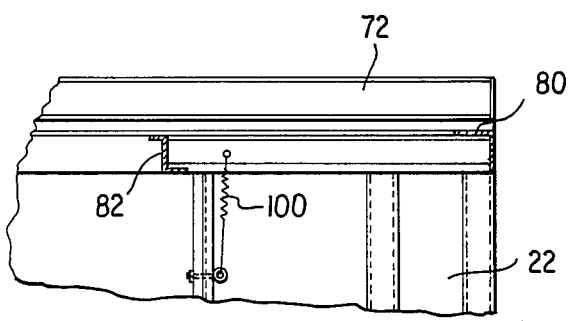
FIG. 5 is a fragmentary longitudinal cross sectional view taken on the line 5—5 of FIG. 2.

The side and front walls of the trailer may also be of conventional construction. Typically, the walls are formed of aluminum sheets supported by corner posts and intermediate vertical bracing members. A door 70 is provided in one of the wall sections 26 for access to the forward auxiliary storage section of the trailer. Mounted at the upper edges of the walls is a top rail 72 which may be an aluminum extrusion and, as is shown in FIG. 4, includes a downwardly opening channel 74 receiving the top of the wall structure, an inwardly opening channel 76 and a quarter round intermediate section 78.

As was mentioned above, the forward section 28 of the trailer roof is fixed. This section is, preferably, formed of aluminum sheets with suitable framing or stiffening members such as transversely extending Z-bars, the forward and lateral edges of this section being received within the channel 76 of the top rail. The rear section 30 of the roof is a rectangular panel formed of aluminum sheets 80 with framing or stiffening members 82, the panel width being slightly less than the distance between the inner faces of the trailer side walls. An angle member 84 is provided on each of the trailer side wall inner faces in downwardly spaced, parallel relation to the channel 76 of the top rail, the angle member 84 extending forwardly from the rear of the trailer by a distance approximately twice the length of the panel. The horizontal legs 86 of these angle members provide track surfaces for rollers 88 which are journalled on side framing members 90 of the roof panel, preferably two rollers being provided on each side. Each of the lateral edges of the panel is also provided with guide buttons 92. A gasket 94, preferably an elastomeric extrusion having a channel portion 96 and a compressable tube portion 98, is mounted on the lower flange of the top rail channels 76 extending from the rear edge of the fixed roof section 28 to the rear of the trailer with the tube portion bearing against the upper surface of the roof rear section panel when closed to create a water seal. A similar gasket is provided along the rear edge of the fixed roof section. In order to hold the panel in position, a latch mechanism 100 is provided, such as a spring loaded door latch.

The rear of the trailer is closed by a door 32 which, in the preferred embodiment, is a single panel door supported by a piano hinge 102 mounted at the rear corner post of the right side wall of the trailer. The door is movable through a 270° arc, i.e., from a closed position to an open position in which the door is parallel to the outer right side wall of the trailer. Any suitable latch mechanism may be employed with the door.

When either launching a boat from or loading a boat into the trailer from the water, the rear door 32 is swung to its fully open position, the floor closure panel 48 is slid forwardly to its open position and the roof panel section 30 is likewise slid to its fully open position. The forward door 70 provides access to the forward portion of the trailer where a winch (not shown) may be mounted. So configured, the trailer may be backed partially into the water and the boat maneuvered into or out of the water in the same manner as would be done with an open boat trailer. The unobstructed rear open section of the trailer floor provided by the closure panel 48 provides clearance for the boat as it moves into or out of the water while the open rear roof section allows the operator to sit or stand in the boat as desired during the launching or loading procedure. After loading a boat into the trailer, the floor closure panel 48 and the roof panel section 30 are slide rearwardly to their closed positions and the rear door is closed. The boat is thus fully enclosed and protected. As was mentioned above, the forward portion of the trailer is available for storage of auxiliary equipment.

While a preferred embodiment of the invention has been shown and described in detail herein, it will be understood that changes and additions may be had therein and thereto without departing from the spirit of the invention. Reference should, accordingly, be had to the appended claims in determining the true scope of the invention.

I claim:

1. A boat trailer comprising:
    a frame supporting a road wheel assembly and, at the forward end thereof, a trailer hitch;
    a floor supported on said frame, said floor including a panel section extending forwardly from the rear end of said frame and symmetric about the longitudinal centerline thereof, means for moving said panel section between a rear position providing a closed floor and a forward position providing an opening in the floor at the rear of said trailer;
    boat hull cradling means mounted on said floor and extending forwardly of said opening;
    side and front walls extending upwardly from said frame;
    a top wall spanning said side and front walls, said top wall including a forward, fixed section and a rear section longitudinally slidable between a rear position closing the top of said trailer and a forward position fully opening the rear portion of said trailer; and
    a rear door constituting the back wall of said trailer.

2. The boat trailer of claim 1 further including an additional door in one of said side and front walls providing access to the forward portion of said trailer.

3. The boat trailer of claim 1 wherein said means for moving includes a pair of framing members extending forwardly from the rear end of said frame in spaced, parallel relation on opposite sides of the longitudinal centerline of said frame, the rear of said frame being open between said framing members, an inwardly opening channel being provided on the underside of each of said framing members, and the lateral edges of said floor panel section being slidably received in said channels.

4. The boat trailer of claim wherein a horizontal track surface is provided on the inner face of each of said side walls of said trailer extending forwardly from the rear thereof and said rear section of said top wall comprises a panel having rollers engaging the upper faces of said track surfaces.

5. The boat trailer of claim 4 further including a gasket mounted at the upper edge of said side walls and engaging the top face of said roof panel to form a water seal therewith.

6. The boat trailer of claim 1 wherein a horizontal track surface is provided on the inner face of each of said side walls of said trailer extending forwardly from the rear thereof and said rear section of said top wall comprises a panel having rollers engaging the upper faces of said track surfaces.

7. The boat trailer of claim further including a gasket mounted at the upper edge of said side walls and engaging the top face of said roof panel to form a water seal therewith.

8. A trailer for carrying and launching a boat which provides full protective enclosure or the boat during transport comprising:

a frame supporting a road wheel assembly and, at the forward end thereof, a trailer hitch said frame including a pair of framing members extending forwardly from the rear end thereof in spaced, parallel relation on opposite sides of the longitudinal centerline of said trailer, a channel extending along each of said framing members and opening toward the centerline, said frame having an open region between the rear portions of said framing members;

a floor supported on said frame except in said open region;

a panel having lateral edges slidably received within said channels and movable between a forward, open position and a rear position closing said open region;

side and front walls extending upwardly from said frame, each side wall mounting, on the inner face thereof, a horizontal track surface extending forwardly from the rear of said trailer;

a top wall spanning said front and side walls, said top wall including a forward, fixed wall section and a rear panel section having rollers engaging said track surfaces, said rear panel section being movable between a forward position in which said panel underlies said fixed top wall section and a rear position closing the top of said trailer; and a rear door constituting the back wall of said trailer.

* * * * *